United States Patent [19]

Knoblach

[11] Patent Number: 5,196,212
[45] Date of Patent: Mar. 23, 1993

[54] ELECTRIC ALIGNMENT OF FIBERS FOR THE MANUFACTURE OF COMPOSITE MATERIALS

[76] Inventor: Gerald M. Knoblach, 2421 Brenner Ct., Roseville, Minn. 55113

[21] Appl. No.: 743,782

[22] Filed: Aug. 12, 1991

Related U.S. Application Data

[62] Division of Ser. No. 520,666, May 8, 1990, Pat. No. 5,057,253.

[51] Int. Cl.$^5$ ............................................. B29C 35/08
[52] U.S. Cl. ............................... 425/174.8 R; 264/24; 264/108; 425/174.8 E
[58] Field of Search ................... 264/24, 108; 425/174.8 R, 174.8 E, 174.6

[56] References Cited

U.S. PATENT DOCUMENTS

| | | | |
|---|---|---|---|
| 3,073,732 | 1/1963 | Hunsdiecker | 264/24 |
| 3,556,969 | 1/1971 | Mizuguchi et al. | 264/24 |
| 4,111,294 | 5/1978 | Carpenter et al. | 264/24 |
| 4,113,812 | 5/1978 | Talbott et al. | 264/24 |
| 4,167,741 | 5/1979 | Heard et al. | 346/75 |
| 4,284,595 | 8/1981 | Peters et al. | 264/108 |
| 4,287,140 | 9/1981 | Peters et al. | 264/24 |
| 4,347,202 | 8/1982 | Henckel et al. | 264/24 |
| 4,432,916 | 2/1984 | Logan | 425/174.8 E |
| 4,752,202 | 6/1988 | Gomi et al. | 425/174.8 E |
| 4,786,366 | 11/1988 | Ito et al. | 264/108 |
| 4,938,844 | 7/1990 | Ito et al. | 264/108 |
| 5,017,312 | 5/1991 | Peters et al. | 284/24 |
| 5,059,107 | 10/1991 | Isomura et al. | 425/174.8 R |

Primary Examiner—Jay H. Woo
Assistant Examiner—Khanh P. Nguyen
Attorney, Agent, or Firm—Dorsey & Whitney

[57] ABSTRACT

An apparatus is disclosed for the production of composite material parts by aligning reinforcing fibers through application of electric fields. The fibers are in the form of rods preimpregnated with a matrix material or coated with a sizing, and aligned within a dielectric alignment fluid. By providing appropriate electrodes, an electric field is created which mimics the stress lines exhibited by the final composite part when under stress. The reinforcing fibers align to the electric field, thereby aligning to the stress lines.

8 Claims, 6 Drawing Sheets

ELECTRIC ALIGNMENT OF FIBERS FOR THE MANUFACTURE OF COMPOSITE MATERIALS

This is a division of application Ser. No. 07/520,666 filed May 8, 1990, now U.S. Pat. No. 5,057,253.

BACKGROUND OF THE INVENTION

1. Field of the Invention

The present invention pertains to the manufacture of composite material parts, such as those made of fiber reinforced plastic, metal, or ceramic. More specifically, the present invention pertains to an apparatus and method of aligning reinforcing fibers in a dielectric alignment fluid by applying an electric field to orient the fibers as desired.

2. Description of the Prior Art

The use of fibers as reinforcement in composite materials is well known in the art. It is also known that optimal reinforcement occurs when the fibers are aligned along critical stress directions in the final part, thus taking full advantage of the fibers' stiffness and strength in reinforcing the part.

Prior art methods of composite part manufacture include manual and automated production techniques, both of which exhibit undesirable limitations. Stated generally, manual techniques are very expensive, and automated techniques are incapable of producing fiber aligned parts in other than a few very specific shapes.

Manual alignment of fibers or continuous filaments involves placing the fibers or filaments in orientations according to the desired strength characteristics of the final part. The fibers or filaments can be placed between layers of the matrix material, or can be in the form of a tape containing the reinforcing fibers as well as the matrix material.

While this method allows reinforcement of the matrix material in virtually any desired pattern, the cost of production is high. Manual placement of fibers is labor intensive, and cannot be easily automated. Thus the cost of the final part is higher than it would be if an automated method was available.

Some solutions to the excessive cost of the manual alignment method include automated techniques such as filament winding, pultrusion, compression and injection molding. Filament winding is a process where fibers are oriented by wrapping around a mandrel, but this technique is generally only useful for producing cylindrical parts. Pultrusion involves pulling continuous fibers through a resin bath and then through a heated die to form its cross sectional shape, but this technique can only produce constant cross section beams and cannot be used to make parts of arbitrary shape. Compression and injection molding can be used with fiber reinforced plastics to produce virtually any shape. No attempt is made to align the fibers into an advantageous orientation in compression molding, and only limited alignment using flow fields is possible in injection molding.

Another solution to the excessive cost of the manual alignment method is a method of aligning fibers by applying a magnetic or electric field, and allowing fibers to fall through this field, thereby aligning the fibers along the field lines while they fall to be collected into a mat below the electrodes. Magnetic field alignment methods are of limited utility, since the fibers need to be ferromagnetic in order to be influenced into alignment by a magnetic field. Since none of the advance fibers in use today are ferromagnetic, they would need to be coated with a ferromagnetic material, substantially increasing the cost of production.

Electric fields are more useful, since they only require that the fiber be electrically conductive, which many of today's advanced fibers are. Thus no additional processing is required prior to alignment of the fibers in an electric field. There are, however, many problems associated with electric field alignment methods. First, the fibers cannot be economically aligned while suspended within the matrix material itself. The matrix material can be in a soft state, allowing for movement of the conductive fibers, but the high viscosity of the typical molten matrix makes alignment slow and difficult. The intensity of the electric field would need to be substantially increased so as to increase the aligning force exerted on the fibers and reduce alignment time, but this can only be done to the point at which the matrix material breaks down and the electric field is shorted out.

In addition, fiber to fiber interactions can prevent proper alignment either within the matrix or within an alignment fluid. As fibers collide with each other, they may physically prevent each other from aligning. Also, prior art electric field alignment techniques are generally directed toward alignment of relatively non-conducting fibers such as wood particles. However, since many of the modern fibers used in production of composite parts are highly conductive, the existing electric field alignment techniques have severe limitations. As the conductive fibers are being aligned, they come into physical contact with each other, forming a chain which locally shorts out the electric field in the vicinity of the chain. They may even gather to form long enough chains to short out the electric field entirely. Reducing the concentration of conductive fibers reduces this effect, but either increases the processing time or reduces the fiber concentration in the vinyl part.

While electric field alignment methods do lend themselves to automated production, they have not provided the flexibility to align fibers into any desired alignment pattern. Such prior art methods are performed between a pair (or multiple pairs) of plate electrodes, and are particularly well suited for aligning fibers into a single linear orientation. The mechanics of these methods do not easily provide facility for either more complex orientations, or for changing alignment patterns while the mat is gathered at the bottom.

Electric field alignment of conductive fibers also suffers from the problem of field distortion near the bottom of the electrodes. As the conductive fibers collect in a mat at the bottom, they form a conductive sheet which tends to short out the electrodes and thus the electric field. One attempted solution to this problem is to provide electrodes that do not reach the bottom, and thus do not contact the fiber mat. As the fibers fall through the electric field formed by parallel plate electrodes, they align according to the resulting parallel electric field lines. However, near the bottom of the electrodes, the field lines are distorted due to the conductive bottom, and as the fibers reach the bottom of the electrodes and are gathered into the mat, they realign according to the distortions rather than remaining aligned with the desired parallel field lines.

In addition, the viscosity of the alignment fluid affects the processing rates and the overall efficacy of the alignment process, however, prior art electric field alignment techniques do not teach whether there is any utility to be gained from proper selection of alignment fluid viscosity.

Another potential solution to the distortions at the bottom of the electrodes is described in U.S. Pat. No. 4,113,812 to Talbott et al, where a voltage gradient is applied to the mat horizontally. The problem with this method is that it is unsuitable for use with composite material fibers due to their high conductivity. A mat of highly conductive fibers would short out the intended voltage gradient and would generate considerable heat, perhaps sufficient to cause the alignment fluid to boil.

Other limitations in the prior art methods become apparent when a three-dimensional fiber orientation is desired. The technique of allowing fibers to drop through an electric field and collecting them at the bottom is generally incapable of producing a non-planar alignment. While an electric field which is not parallel to the collecting surface could conceivably be created, the fibers would be subjected to a physical force as they contact the collecting surface, which would tend to realign the fibers so as to be parallel to the collecting surface.

Another problem with prior art methods of producing composite material parts is that strong reinforcing fibers tend to be expensive, and previous automated alignment methods do not make efficient use of these fibers. The prior art does not disclose an automated method which the fibers can be advantageously placed in locations of the part where most needed. Rather, the entire part must contain the same concentration of fibers as is needed in the most critical location of the part.

It is evident that there is a continuing need in the prior art for an efficient and automatable method of aligning fibers for the reinforcement of a matrix material in the manufacture of composite parts. There are also continuing needs for a method of aligning highly conductive reinforcing fibers, a method which makes efficient use of expensive reinforcing fibers, a method capable of producing a three-dimensional alignment pattern, and an apparatus capable of effectuating such methods.

SUMMARY OF THE INVENTION

In accordance with the present invention, reinforcing fibers are aligned under the influence of an electric field. The fibers are pre-impregnated with matrix material to form prepreg rods with the fibers oriented along the length of the prepreg rods, and are dispersed onto the surface of a tank filled with a dielectric fluid. The fibers, the matrix material, a conductive coating on the rod or fibers, or a filament within the prepreg rod is conductive, and thus allows the orientation of the prepreg rods to be influenced by application of an electric field.

In accordance with another aspect of the present invention, reinforcing fibers are sized (coated) with a thermal formable material and aligned under the influence of an electric field. The sized fibers rods are aligned into a preform mat in the shape of the final part, and then impregnated with a special low viscosity matrix material.

In one embodiment of the present invention, a tank contains a dielectric fluid which has a density less than that of the prepreg rods. An electric field is applied within the dielectric fluid, such that the flow lines of the field correspond to the desired orientation of the fibers. The applied field is of decreasing vertical intensity, terminating at the bottom of the tank with zero intensity. This is accomplished through the use of resistive or voltage gradient electrodes, fed from the top with high voltage and shorted at the bottom by the bottom of the tank which is conductive. This arrangement ensures that there will be no distortions of the field lines in the vicinity of the conductive collecting surface. The prepreg rods are then dispersed onto the surface of the dielectric fluid, and allowed to sink through the fluid while under influence of the electric field, and are collected at the bottom of the tank in their aligned orientation.

In another embodiment of the present invention, the fibers are aligned according to the stress lines in the composite material part when in use. This is done by providing a tank in the shape of the desired part, with electrodes located at load bearing surfaces according to the mechanical design of the part. An electric potential is applied between the electrodes, creating electric field lines analogous to the stress lines of the part. As the fibers fall through the dielectric fluid, they are aligned along these stress lines, optimally reinforcing the part according to the physical stress it will endure in operation.

In another embodiment of the present invention, a method is provided for aligning fibers into a three-dimensional orientation. This is done by selecting the dielectric fluid to have the same density as the prepreg rods. The rods will not sink toward the bottom, but rather will remain suspended in the fluid. An electric field is applied, with field lines corresponding to the desired orientation of the fibers. The applied field need not be co-planar with the bottom of the tank, since the prepreg rods will not collect at the bottom. If a non-planar electric field is applied, the resulting fiber orientation will be non-planar. Once alignment is complete, the prepreg rods are bound into their aligned orientation, and the electric field and the dielectric fluid may be removed.

In another embodiment of the present invention, a method is provided for preferentially locating reinforcing fibers in locations of a composite material part where they are most needed. Again, a tank containing a dielectric fluid is used, and an electric field aligns the fibers. The prepreg rods added to the tank comprise a mixture of strong prepreg rods and weaker rods. The strong rods contain strong reinforcing fibers, and the weaker rods contain weaker fibers, or perhaps no fibers. The strong rods are conductive so as to be influenced by the electric field, while the weaker rods are non-conductive or substantially less conductive, so as to be less influenced or uninfluenced by the electric field. The strong prepreg rods can be made conductive by use of a conductive fiber, a conductive filament included in the prepreg rod, by use of a conductive coating, or any other method generally known to one skilled in the art. When the electric field is applied, the strong prepreg rods will align according to the field lines, and will migrate toward locations of higher field intensity, displacing the weaker rods toward locations of lower field intensity. This results in a higher concentration of strong rods in the preferred locations, resulting in reduced material cost since fewer strong rods need to be used.

In another embodiment of the present invention, an apparatus is provided which is capable of effectuating the methods of the present invention. The apparatus includes a tank, a dielectric alignment fluid, a source of high voltage and electrodes. The electrodes may be voltage gradient, and can be in any shape including plates, rods, and spheres. This allows for creation of virtually any pattern of field lines desired, and for electronic control of the pattern of field lines by switching electrodes on and off, and controlling the relative voltage and Alternating Current (AC) phase between electrodes during formation of the part.

Accordingly, it is an object of the present invention to provide an efficient method of manufacturing composite materials, wherein the reinforcing fibers are aligned in a dielectric fluid by application of an electric field.

It is another object of the present invention to provide a method of aligning fibers according to the stress lines in the composite material part when in use.

It is another object of the present invention to provide a method for aligning fibers into a three-dimensional orientation.

It is another object of the present invention to provide a method for preferentially locating reinforcing fibers in locations of a composite material part where they are most needed.

It is another object of the present invention to provide an apparatus capable of effectuating the methods of the present invention.

These and other objects of the present invention will become apparent with reference to the drawings, the detailed description of the preferred embodiment, and the appended claims.

DESCRIPTION OF THE PREFERRED EMBODIMENTS

The present invention is directed toward a method of aligning reinforcing fibers using an applied electric field, using fibers such as graphite, carbon, glass, aramid (Kevlar), boron, silicon carbide, and various metals. Those skilled in the art will recognize that there are numerous variations possible within the scope of the present invention. There are many factors which will determine the exact method and apparatus needed for a particular application, including the material the part is to be made of, the type of reinforcing needed, the pattern of reinforcing needed, and others. These and other considerations will be discussed in describing the preferred embodiments of the present invention.

Some of the details concerning electric alignment of reinforcing fibers according to the present invention are contained in an article entitled "USING ELECTRIC FIELDS TO CONTROL FIBER ORIENTATION DURING MANUFACTURE OF COMPOSITE MATERIALS" which was authored by the present inventor and was published in the Society For the Advancement of Material and Process Engineering (SAMPE) International Symposium, Volume 34, page 385, 1989, and which is incorporated herein by reference.

Figure 1:
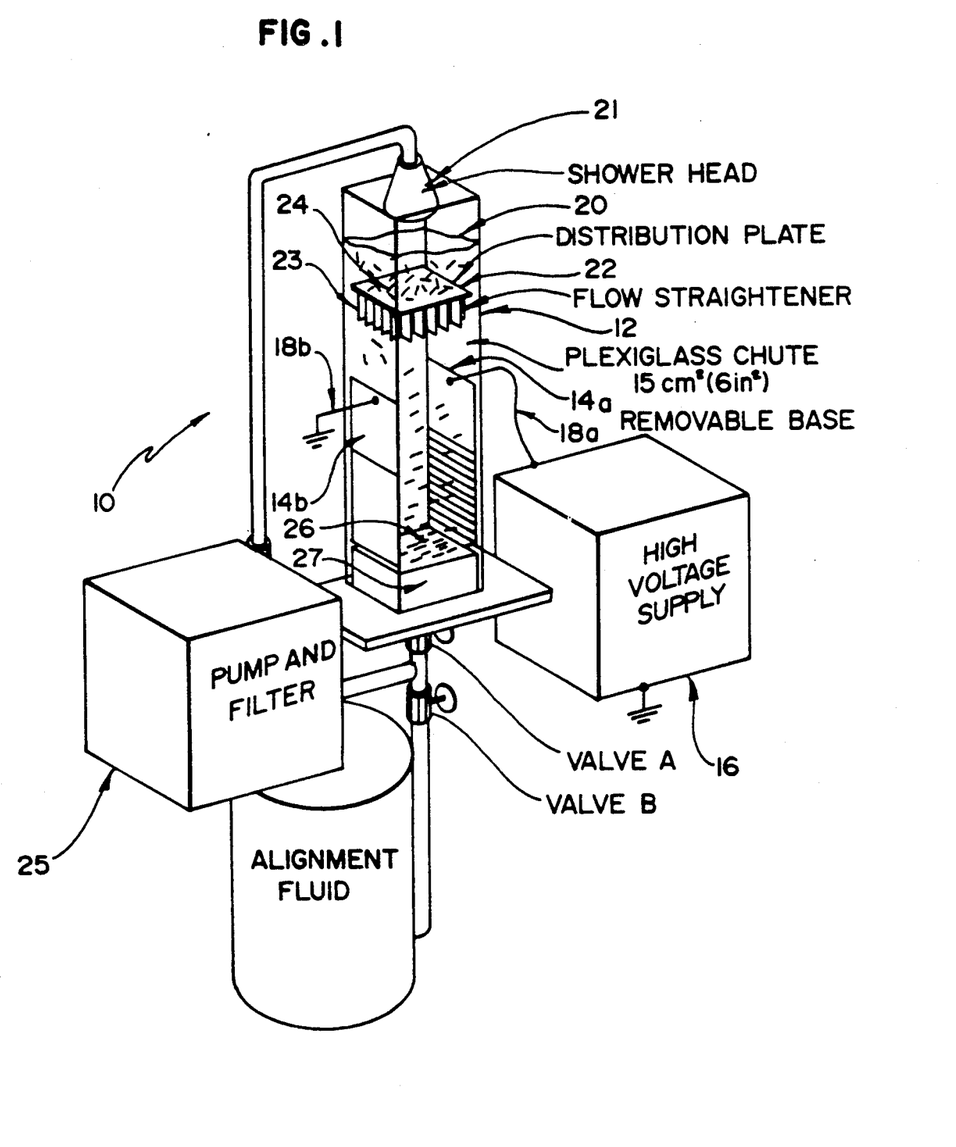
FIG. 1 shows a typical apparatus for using electric fields to align fibers in a dielectric alignment fluid.

Referring now to FIG. 1, a representation of a typical alignment apparatus 10 is shown. The alignment apparatus 10 includes an alignment tank 12 of a nonconductive material with two plate electrodes 14a and 14b, which are shown substantially parallel and facing each other, but which could be in any orientation depending upon the alignment pattern desired. A source of high voltage 16 is connected through wires 18a and 18b to the electrodes 14a and 14b. Within the tank is an alignment fluid 20, which is preferably nonconductive and dielectric. The tank also contains a shower head 21, a distribution plate 22, and a flow straightener 23. A sufficient quantity of prepreg rods 24 is placed on the distribution plate 22, which is located approximately two inches below the surface of the alignment fluid 20. The pump 25 circulates alignment fluid 20 from the bottom of the tank 12 to the shower head 21, filtering any accumulated contaminants from the fluid 20. The fluid flow from the shower head 21 agitates the prepreg rods 24, causing them to fall through perforations in the distribution plate 22, providing a uniform distribution of prepreg rods across the cross section of the tank. The flow straightener 23 consists of vertical baffles which serve to eliminate any turbulence in the downward flow of alignment fluid 20 and prepreg rods 24.

A prepreg rod 24 is a rod of matrix material containing reinforcing fibers aligned longitudinally. The alignment fluid 20 is chosen to have a density less than that of the prepreg rods 24, so that when the prepreg rods 24 are placed on the surface of the alignment fluid 20, they sink toward the bottom of the tank 12. Details of the prepreg rods will be discussed in reference to FIGS. 9, 10a-d.

As the prepreg rods enter the alignment fluid 20, they are subjected to an electric field (not shown) induced by the voltage applied to the electrodes 14a and 14b. The prepreg rods 24 are conductive, and this conductive nature causes them to become electric dipoles which then align with the electric field. Thus the reinforcing fibers contained within the prepreg rods 24 are aligned according to the electric field induced within the tank 12. The prepreg rods 24 fall through the alignment fluid 20 to the conductive bottom 27 of the tank 12, where they are collected into a mat of aligned rods 26.

Since the bottom 27 is conductive, there is effectively no electric field acting upon the prepreg rods once they reach the bottom 27, thus the electric field orientation can be changed without disturbing the prepreg rods 24 which are already aligned and at the bottom of the tank. In addition, friction prevents the prepreg rods 24 within the mat of aligned rods 26 from changing their alignment. Thus, the electric field can be changed so as to cause a different alignment of the prepreg rods in different layers of the mat 26 gathering at the bottom of the tank 12. One skilled in the art will recognize that the electric field may be changed by any number of methods, including changing the voltage applied to the electrodes, switching to other electrodes, using different shapes of electrodes, and applying various Alternating Current (AC) voltage sources with various phase relationships between the electrodes.

Once the prepreg rods 24 are collected into the mat 26, the alignment fluid 20 is removed, and the mat can be placed into a mold for manufacture of the desired composite part according to traditional methods. Alternatively, the mat 26 may simply be heated in order to bond the loosely packed prepreg rods 24 together, retaining the fiber alignment and allowing the mat to be stored for later molding.

The alignment fluid 20 must be chosen to optimize the production process. The optimum viscosity of the fluid depends upon the size, shape, and conductivity of the prepreg rods 24, and the magnitude of the electric field introduced between the electrodes 14a and 14b. Electrohydrodynamic theory could predict the optimum combination of these parameters, however, a workable combination can be much more easily derived through minimal experimentation by one skilled in the art. If the chosen alignment fluid 20 has a viscosity that is too low, the prepreg rods 24 will oscillate in a rotary fashion about their minor axis as they descend toward the mat 26, causing a substantial amount of misalignment. If the viscosity is too high, then the prepreg rods 24 will take too long to fall and too long to align, lengthening the production time and increasing the cost. Ideally, the prepreg rod—electric field—alignment fluid system will have a damping ratio of 0.7 (70% of critical damping). Factors affecting this include the size and shape of the prepreg rods, the viscosity of the alignment fluid, the conductivity of the prepreg rods, and the intensity of the electric field.

The alignment fluid 20 must be chosen to have an adequate dielectric strength to reduce the possibility of arcing. Since some degree of arcing is likely to occur anyway, the chosen fluid ideally would be nonflammable. The fluid also must not dissolve or otherwise chemically react with the fibers or the matrix material.

In addition, the density of the alignment fluid 20 must be chosen. If the fluid density of the chosen alignment fluid is too low, the rods will sink too fast causing turbulence and misaligned rods. In addition, the rods may not have sufficient time to fully align. If the fluid density of the chosen alignment fluid is too high, then the rods will descend through the fluid slower than is necessary, resulting in the process taking too long. The fluid chosen thus depends upon the specific gravity of the prepreg rods 24 used. For specific gravities of 1.4 to 1.6, halogenated hydrocarbon solvents such as freons and 1,1,1 trichloroethane can be used. For specific gravities of 0.9 to 1.2, light weight mineral oils and low viscosity silicone oils can be used. If necessary, a mixture of two or more fluids would allow for precise control of the density over a wide range of values. In addition, the rate at which the prepreg rods 24 descend in the tank can be adjusted by controlling the fluid flow rate through the shower head 21.

Figure 2:
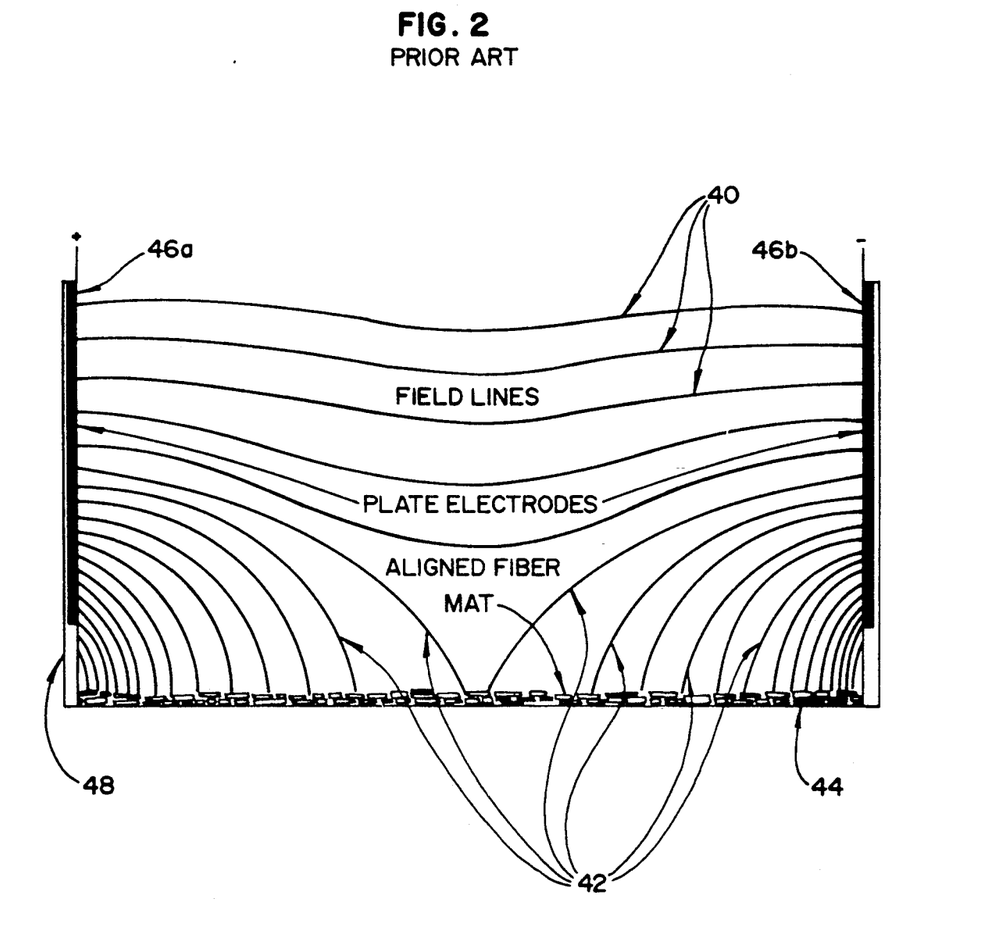
FIG. 2 shows prior art field distortion due to the conductive bottom of the tank below the electrodes.

Referring now to FIG. 2, field lines 40 between parallel plate electrodes 46a and 46b are shown, including distorted field lines 42 caused by the presence of a conducting bottom 44 of the tank. The conducting bottom 44 is due to either the tank bottom material being conductive, or the mat of conductive fibers being collected at the bottom. Fibers placed in the tank 48 are correctly aligned by the substantially parallel field lines 40 while they are near the top of the tank. As they descend toward the bottom, they are no longer influenced by field lines which are substantially parallel, but rather are influenced by the distorted field lines 42 near the bottom 44. This will cause the fibers on the bottom near the plate electrodes 46a and 46b to stand on end rather than remain aligned in the intended planar orientation.

Figure 3:
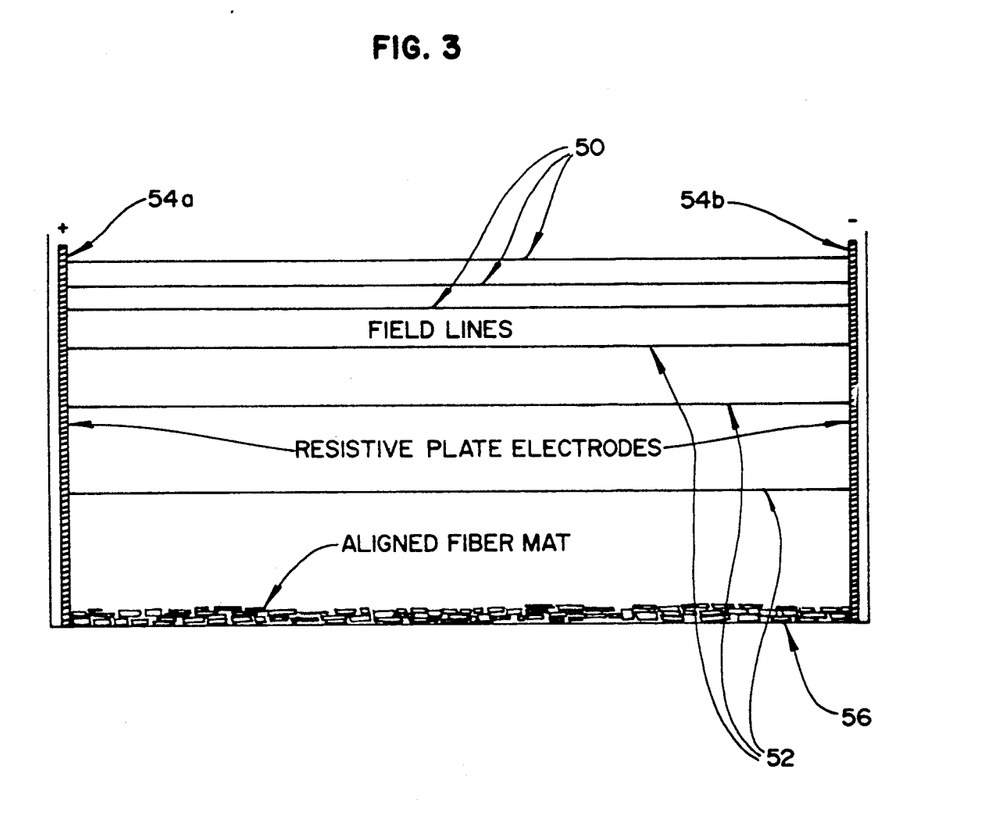
FIG. 3 shows undistorted field lines due to resistive or voltage gradient electrodes.

An improvement according to one aspect of the present invention is to use voltage gradient electrodes, such as using plates of a resistive material. The resistive plates will act like voltage dividers, gradually lowering the field strength from full strength at the top to zero at the bottom. The resulting field lines are shown in FIG. 3, where the field lines near the top of the tank 50 are drawn close together indicating a high field strength, while the field lines near the bottom of the tank 52 are drawn further apart indicating reduced field strength. Parallel plate electrodes 54a and 54b are of a resistive material, and are both connected to the bottom 56 of the tank, which is conductive so as to assure zero field intensity at the bottom. The resulting field lines are parallel and without the distortions shown in the prior art of FIG. 2.

Figure 4A:
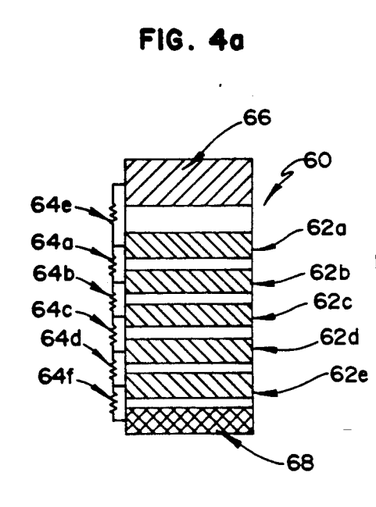
FIGS. 4a and 4b show the construction of one embodiment of a voltage gradient electrode.
Figure 4B:
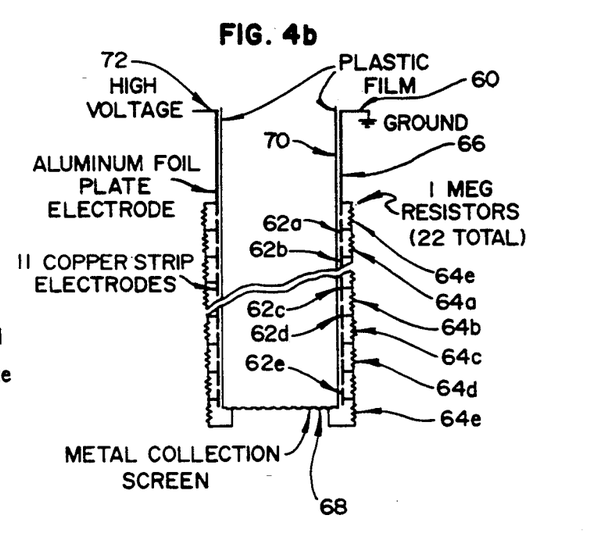

An alternative embodiment of voltage gradient electrodes is shown in FIGS. 4a and 4b, with FIG. 4b showing a side view of two parallel plate voltage gradient electrodes. Each electrode 60 comprises a plurality of conductive strips 62a-e arranged horizontally and spaced so as to not touch each other. Resistors 64a-d connect to the copper strips 62a-e as shown, so as to form a voltage divider. Resistor 64e connects the upper most conductive strip 62a to a conductive plate 66. The size of the plate 66 relative to the overall size of the electrode 60 determines which portion of the electrode 60 is voltage gradient. Resistor 64f connects the lower most conductive strip 62e to a metal collecting surface 68. The electrode 60 may be insulated with a plastic film 70 or other insulating material to prevent conductive fibers from contacting the electrode and shorting out the electric field, if necessary. As seen in FIG. 4b, the second electrode 72 is identically connected with resistors and to collecting plate 68. When a source of high voltage (not shown) is connected to the top sections of electrodes 60 and 72, the result is a full strength electric field near the top, with a vertically decreasing intensity terminating in zero intensity at the collecting surface 68.

In a preferred embodiment of the present invention, the resistors are 1MΩ, ¼ watt resistors, with ten 1" copper strips forming the voltage gradient portion of each electrode. The collecting surface 68 is preferably a metal screen so as to provide a conducting surface for collection of fibers, while allowing for draining or circulation of alignment fluid through the bottom of the tank.

One skilled in the art will recognize that many variations of a voltage gradient electrodes are possible within the scope of the present invention, including the use of various conducting and insulating materials, various numbers of segments, and various resistive values.

While parallel plate electrodes are ideal for uniaxial alignment patterns, they are unsuitable for most other desired alignment patterns. Many composite parts have stress lines that are not uniaxial, and thus a uniaxial alignment of reinforcing fibers is not optimal. Since the desired orientation of reinforcing fibers is along stress lines in the final part, and since fibers will align according to an applied electric field, it is advantageous to apply an electric field that imitates the stress lines the final part is expected to exhibit. In order to provide an electric field that is not uniaxial, electrodes other than plates are required. In general, placing electrodes at positions corresponding to load bearing surfaces will result in an electric field that imitates the stress lines exhibited in the final part.

Figures 5A, 5B:
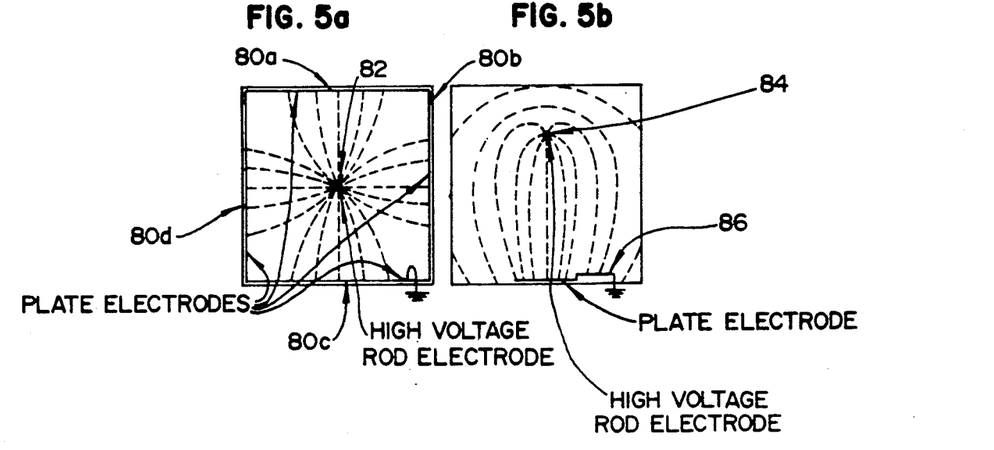
FIGS. 5a and 5b are top views of an alignment tank showing field lines due to rod and plate electrode combinations.

Referring now to FIGS. 5a and 5b, two examples of alignment patterns using plate electrodes and a single rod electrode are shown. FIG. 5a shows a top view of an alignment tank bordered with plate electrodes 80a-d which are connected together and grounded. Rod electrode 82 is connected to a high voltage source (not shown), and is a voltage gradient electrode, constructed of a continuously resisted material, in a manner similar to the voltage gradient electrodes of FIGS. 4a and 4b, or may simply be a string of resistors soldered together end to end with an insulating cover. The plate electrodes 80a-d and the rod electrode 82 are connected to a conductive collecting surface at the bottom, in a fashion similar to that shown in FIG. 4b. The resulting field lines (and fiber orientations) are shown as dashed lines, and are radial from the rod electrode 82 outward to the plate electrodes 80a-d.

FIG. 5b is similar in using a single rod electrode 84, but has only a single plate electrode 86. The resulting field lines (and fiber orientations) are again shown as dashed lines, but in this example are no longer uniformly radial, rather they all tend to terminate at the single plate electrode 86 and are in greater density in the area immediately between the rod electrode 84 and the plate electrode 86. This field distribution pattern simulates the stress field created in a bolt hole loaded in tension.

By placing electrodes at load bearing surfaces of the final part, another advantage of the present invention can be realized, that is the ability to automatically sort prepreg rods. Strong reinforcing fibers tend to be expensive, and ideally would be placed only where their superior strength characteristics were needed. This can be accomplished to some degree of effectiveness by providing a mixture of strong (expensive) and weak (inexpensive) prepreg rods. The strong rods are made conductive by one of the methods described above, and the weak rods are made nonconductive. The strong rods will thus be influenced by the electric field while the weak rods will not. When electrodes are placed at load bearing surfaces such as with the plate and rod electrodes in FIG. 5b, the electric field is stronger at the high stress locations in the part, such as between the electrodes as shown by the dashed lines in FIG. 5b. Not only will the strong rods tend to align with the field lines, they will also migrate toward areas of increased field strength, displacing the weak rods to areas where reinforcing is less critical. Thus, placement of electrodes at load bearing surfaces can automatically optimize not only the orientation, but also the placement of fibers in the composite part. In a like fashion, the mixture could be of stiff and less stiff rods, so as to preferentially locate stiff rods in a desired stiff portion of the final composite part.

Those skilled in the art will recognize that the placement, type, and shape of electrodes may be varied, depending upon the function of the composite part desired, without departing from the scope of the present invention. Specifically, any shape of electrode can be used, including plates, rods, spheres, and irregular surfaces, as determined by the shape of the load bearing surface of the composite part.

One problem unique to highly conductive fiber alignment is the potential for shorting. As the fibers align in the electric field, they come into physical contact with each other forming chains. These chains locally short out the electric field resulting in distortions, and if the chains become long enough, they could short out (or arc out) the entire electric field. Even if voltage gradient electrodes are used, a short can cause major disruption to the field pattern.

Figure 6A:
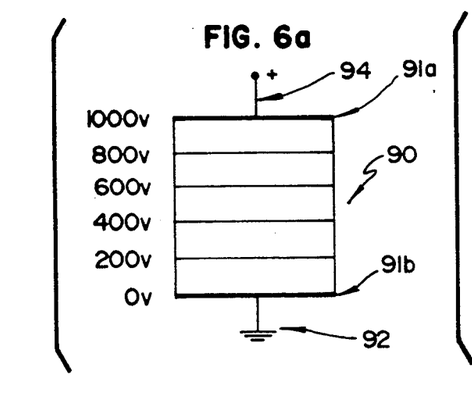
FIG. 6a shows a typical voltage gradient on the face of a voltage gradient plate electrode.
Figure 6B:
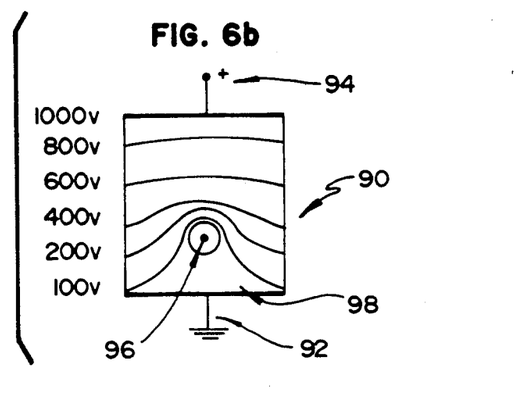
FIG. 6b show distortions in the voltage gradient of FIG. 6a due to a short on the face of the electrode.

Referring now to FIG. 6a, a resistive plate electrode 90 is shown with conductive strips on the top and bottom edges 91a, 91b, with the bottom strip 91b connected to ground 92 and the top strip 91a to a source of high voltage 94. The horizontal lines are lines of equipotential, and are labeled to show a typical voltage gradient appearing on the electrode 90. They show a decreasing electric field intensity as you approach the bottom of the electrode. FIG. 6b shows how the equipotential lines are distorted when a chain of fibers contacts the electrode at a short point 96. Little if any electric field remains in the region below the short point 98, resulting in less effective alignment of the fibers. Assuming the alignment system is optimized so that the fibers tend to reach stable alignment by the time they reach the bottom, the presence of the short substantially reduces the amount of time a fiber is exposed to the electric field, which results in an increase in misaligned fibers. In addition, these distorted equipotential lines will result in distortions in the electric field orientation which may further impair proper fiber alignment.

Figure 7:
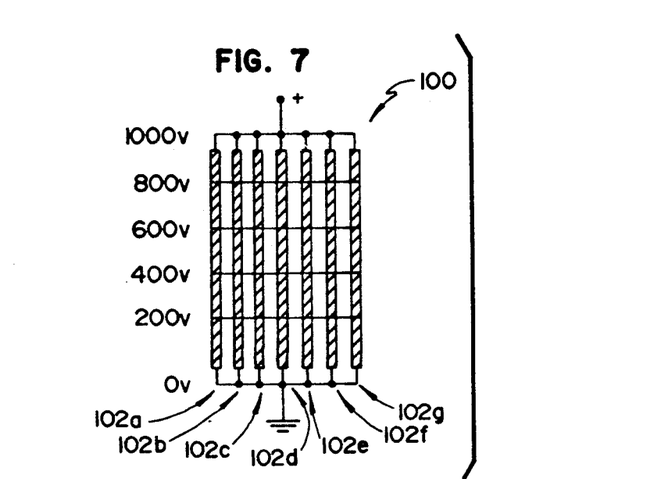
FIG. 7 shows the voltage gradient of a plate electrode simulated using discrete voltage gradient rod electrodes.

One solution is to use a plurality of rod electrodes to simulate the effect of a plate electrode, as is shown in FIG. 7. A plate electrode is comprised of multiple rod electrodes 102a-g, in a planar arrangement and spaced apart so as not to be in contact with each other. Rod electrodes 102a-g are voltage gradient electrodes, constructed from a continuous resistive material, or in a manner similar to the voltage gradient electrodes of FIGS. 4a and 4b, or each may simply be a string of resistors soldered together end to end. If a chain of fibers causes a short to occur, only one of the rod electrodes 102a-g will show a distorted voltage gradient, and thus the bulk of the electric field remains intact.

One skilled in the art will recognize that many arrangements are possible within the scope of the present invention, including varying the number of rod electrodes, the type and manner of rod electrode construction, and the spacing between rod electrodes.

According to one embodiment of the present invention, reinforcing fibers are preimpregnated with matrix material and formed into rods called prepreg rods. The rods may be formed by pultruding continuous fiber filaments through a molten matrix material, in a manner as is known in the art, and then cut into segments to form the rods. The prepreg rods are then aligned in a manner previously described. When aligned, the alignment fluid is drained, and the accumulated mat of prepreg rods is molded into the desired part. Alternately, rather than draining the alignment fluid, the bottom of the tank could be equipped with a conveyor so as to remove the accumulated mat as it forms, resulting in a continuous operation.

Figure 8A:
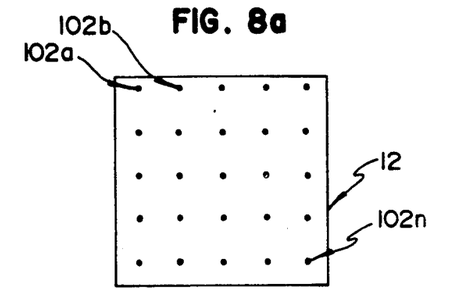
FIGS. 8a, 8b, 8c, and 8d show various possible grid arrangements of rod electrodes.

Referring now to FIG. 8a, a top view of an alignment tank with multiple rod electrodes 102a-n arranged in a square grid fashion. By individually controlling the potential of each electrode 102a-n, it is possible to produce either vertical or horizontal field orientation, and to change orientation at will during the production process. For example, a vertical orientation would be acheived by connecting the first horizontal row of electrodes to high voltage, and the next horizontal row of electrodes to ground, and repeating this pattern for the remaining electrodes. Likewise, a horizontal orientation would be achieved by connecting the first vertical column of electrodes to high voltage, and the next vertical column of electrodes to ground, and repeating this pattern for the remaining electrodes. Those skilled in the art will recognize that by proper control of the electrodes, ±45° diagonal orientations can be easily achieved.

Figure 8B:
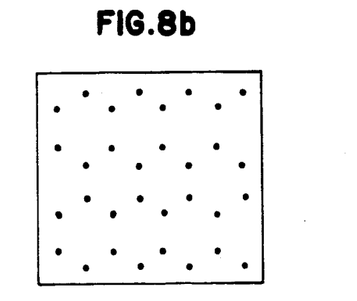

FIG. 8b shows a grid of rod electrodes similar to that in FIG. 8a, except in a hexogonal arrangement, allowing for ±30° and ±60° diagonal orientations. By chosing other grid patterns or geometries, other angles can be obtained as desired.

Figure 8C:
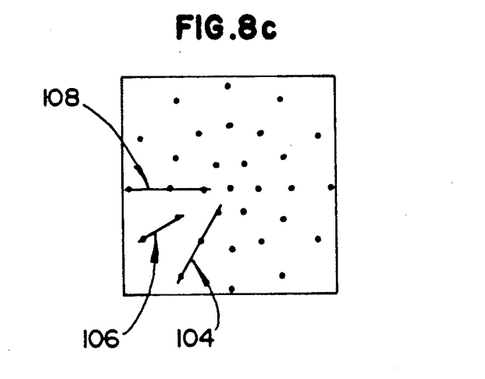

FIG. 8c shows a circular grid pattern capable of providing both circular and radial alignment orientations. A first group of electrodes 104 is connected to one polarity of a high voltage source, and a second group of electrodes 106 is connected to the opposite polarity. This creates a field in the sector defined between the two groups of electrodes 104, 106, which causes fibers within this sector to align perpendicular to the radial direction. After a certain time, the sector defined by the energized electrodes is rotated to a new pair of electrode groups adjacent the first pair. In this example, electrode group 106 would be given the polarity that group 104 had previously, and group 108 would be given the polarity that group 106 had previously. This rotation would then continue until processing at this alignment pattern is complete.

Figure 8D:
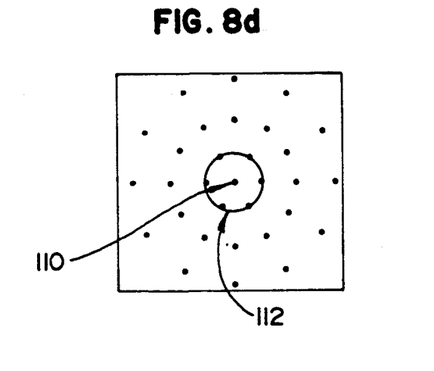

FIG. 8d shows the same grid pattern of rod electrodes as in FIG. 8c. In this example, the electrodes are controlled so as to produce a radial alignment pattern. Electrode 110 is connected to one polarity of a high voltage source, and a group of electrodes 112 is connected to the opposite polarity. This defines an annular ring within which fiber will tend to align radially. After a certain time, the high voltage is connected so as to define a larger annular ring, whereby the aligning zone is moved outward much like the aligning sector was rotated in FIG. 8c.

With electronic control over the electrodes, those skilled in the art will recognize that virtually any alignment pattern can be created, and that several different alignment patterns can be used in production of single composite part.

Figure 9:
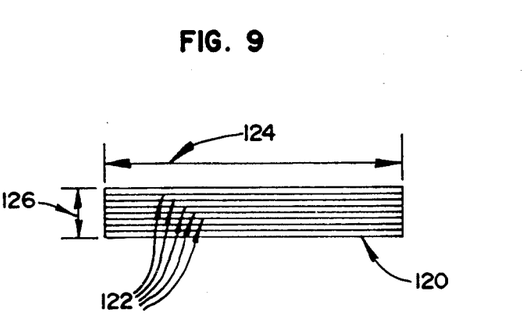
FIG. 9 shows a side view of a prepreg rod, depicting its aspect ratio.

In order to provide a predictably effective system of aligning prepreg rods, the electrical and mechanical properties of the prepreg rods must be well known and consistent. The shape of the prepreg rod is important, especially the aspect ratio. Referring now to FIG. 9, a prepreg rod 120 is shown with a plurality of reinforcing fibers 122 contained within. The fibers run axially in the rod along its longest dimension, and are preferably continuous from one end to the other. The amount of fiber 122 in the prepreg rod as compared to the total rod volume is important in adding strength to the final part. Ideally, 50-70% of the prepreg rod by volume would be fiber, although significant benefits can be seen at as low as 10% fiber by volume. For processes where the prepreg rods consist of sized fiber rods which are aligned and then fully impregnated later, the sized fiber rods should ideally contain 1-10% matrix material by volume. In order for the prepreg rod 120 to fall through the alignment fluid without spiraling, the cross sectional shape of the prepreg rod must be uniform. Prepreg cross sectional shapes will be discussed in more detail in reference to FIGS. 10a-c. The aspect ratio of the prepreg rod is defined as the ratio of the total length 124 divided by the smallest dimension of the cross section 126. The aspect ratio must be greater than 100 for the final composite part to have mechanical properties approaching those of continuous fiber composites, although prepreg rods having any aspect ratio greater than one are capable of being aligned.

Figure 10A:
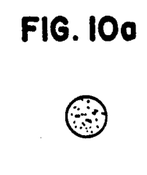
FIGS. 10a, 10b, 10c, and 10d show various possible cross sections of prepreg rods, depicting the cross section aspect ratio.
Figure 10B:
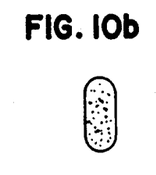
Figure 10C:
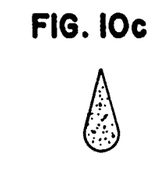
Figure 10D:
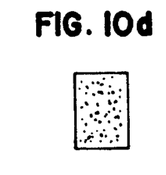

It is also important to control the cross sectional shape of the prepreg rods. Referring now to FIGS. 10a-d, various possible cross sectional shapes are shown. If the prepreg rods are formed by pultrusion as described above, then they can be pulled through a die so as to create prepreg rods of any desired shape. FIG. 10a shows a circular cross section. Such prepreg rods will work in an alignment system according to the present invention, but are not ideal since the processing rate depends upon the total volume of the prepreg rod and how fast it sinks. Preferred shapes include an ellipse as shown in FIG. 10b. An elliptical cross sectioned prepreg rod will fall through the alignment fluid in a manner so as to present the lowest drag (and thus the minimum area) to the flow. For elliptical cross sections with a cross sectional aspect ratio of less than approximately five, the elliptical rod can sink as fast as a circular rod, but will carry up to five times the volume to the mat. A teardrop shape as shown in FIG. 10c can achieve even further increases in production efficiency. A rectangular cross section as shown in FIG. 10d is not ideal a flow viewpoint, but may desireable due to ease of manufacture of rectangular cross section prepreg rods.

Electric fields can also be used to produce composite parts with three dimensional fiber alignment patterns, by using an apparatus similar to that shown in FIG. 1. The tank 12 is made into the same shape as the composite part, only larger in every dimension, so as to allow more freedom of movement of prepreg rods within the tank. A volume of prepreg rods 24 sufficient to produce the part is evenly mixed into the tank along with an alignment fluid 20. According to this aspect of the present invention, the prepreg rods are required to remain suspended within the alignment fluid, rather than sink toward the bottom. Thus, the alignment fluid 20 preferably has a density equal to that of the prepreg rods 24.

Electrodes 14a, 14b are located within the tank at locations and orientations corresponding to the load bearing surfaces of the final part. The shape of the electrodes is determined by the shape of the particular load bearing surface. An electric field is applied between the electrodes, creating a three dimensional alignment pattern within the tank, to which the prepreg rods 24 align. Once alignment is complete, the prepreg rods 24 are bound onto their aligned positions. The alignment fluid 20 can then be removed by evaporation or hydrostatic pressure, causing the prepreg rod structure to shrink nearly to the size of the final part, while retaining the alignment of the fibers. The resulting block of prepreg rods is then molded according to known methods to produce the final part.

Bonding of the prepreg rods 24 into their aligned orientations can be accomplished in one of several ways. The alignment fluid could be chemically caused to gel, thus preventing the prepreg rods from disorienting. Alternatively, the alignment fluid could be an ultraviolet curable plastic, and a laser could be scanned in a grid pattern through the alignment fluid, creating a gridwirk of cured plastic which would hold the prepreg rods 24 in their aligned orientation. Another method might be to coat the prepreg rods 24 with a sponge-like material, which would absorb the alignment fluid and expand to hold the prepreg rods 24 in place. Those skilled in the art will recognize that any method which holds the rods in place without disturbing their alignment will work according to this aspect of the present invention.

Although the description of the prefered embodiments have been presented, it is contemplated that various changes could be made without deviating from the spirit of the present invention. Accordingly, it is intended that the scope of the present invention be dictated by the appended claims rather than by the description of the prefered embodiment.

What is claimed is:

1. An apparatus for aligning prepreg rods for the manufacture of composite materials comprising:
   a) an alignment tank having a top and a conductive bottom;
   b) alignment fluid disposed within said tank having a density less than that of the prepreg rods;
   c) a source of high voltage; and
   d) a plurality electrodes, including at least one generally vertical rod electrode, disposed in said tank and electrically connected to said source of high voltage, said plurality of electrodes being arranged such that upon application of said high voltage, an electric field is generated between said plurality of electrodes and said prepreg rods are aligned relative to said field into a desired prepreg rod alignment as said prepreg rods fall by gravity through said alignment fluid from the top of said alignment tank toward said conductive bottom.

2. An apparatus for aligning prepreg rods for the manufacture of composite materials comprising:
   a) an alignment tank having a top and a conductive bottom;
   b) an alignment fluid disposed within said tank;
   c) a source of high voltage; and
   d) a plurality of voltage gradient electrodes disposed in said tank, each of said electrodes being electrically connected to said source of high voltage at one location and to said conductive bottom of said tank at another location provided an electric field intensity which decreases from the top of said tank toward the bottom to align said prepreg rods relative to said field into a desired prepreg rod alignment as said prepreg rods move through said alignment fluid from the top of said alignment tank toward said conductive bottom.

3. The apparatus of claim 1 wherein said one electrode includes means for decreasing the intensity of said electric field from the top of said alignment tank toward the bottom.

4. The apparatus of claim 3 wherein said one electrode is a gradient electrode.

5. The apparatus of claim 2 wherein at least one of said electrodes comprises a plurality of rod electrodes.

6. The apparatus of claim 5 wherein said plurality of rod electrodes is disposed side-by-side in a planar arrangement.

7. The apparatus of claim 1 including a plurality of rod electrodes disposed in said tank.

8. The apparatus of claim 7 wherein at least two of said rod electrodes are charged with different voltages to provide said desired prepreg rod alignment.

* * * * *